J. ZSARKÓ.
LUBRICATOR.
APPLICATION FILED APR. 7, 1909.
993,433.
Patented May 30, 1911.
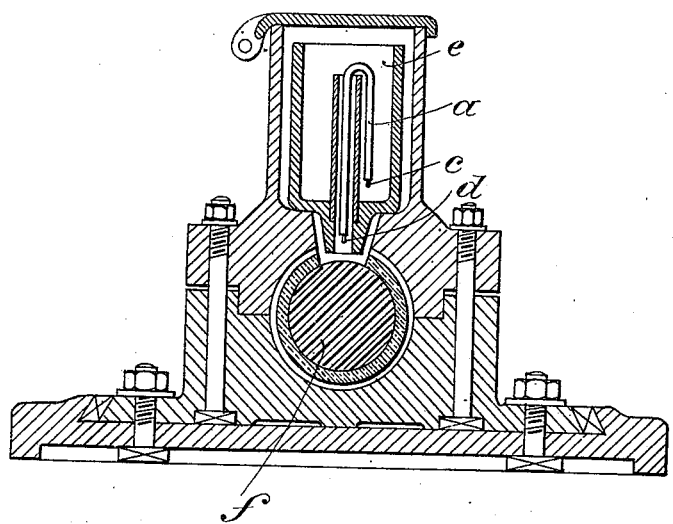
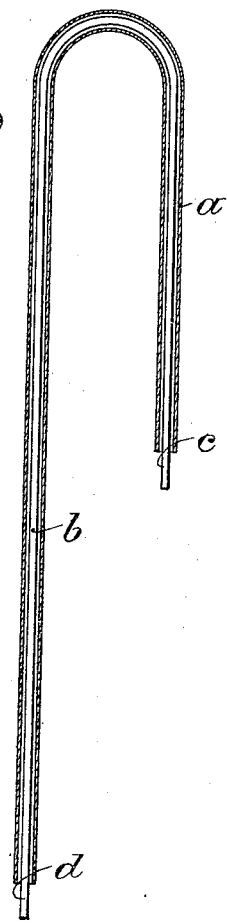

UNITED STATES PATENT OFFICE.

JOSEF ZSARKÓ, OF BUDAPEST, AUSTRIA-HUNGARY.

LUBRICATOR.

993,433.  Specification of Letters Patent.  Patented May 30, 1911.

Application filed April 7, 1909. Serial No. 488,365.

*To all whom it may concern:*

Be it known that I, JOSEF ZSARKÓ, a subject of the King of Hungary, residing at Budapest, in Austria-Hungary, have invented a certain new and useful Lubricator, of which the following is a specification.

This invention relates to a device which lubricates shaft-bearings or other moving parts of machinery in a most economical manner.

The device is of the siphon type of lubricators and is constituted by a curved communication pipe, the short branch of which dips into an oil-tank, while the long one leads to the shaft to be lubricated, and the essence of the invention comprises an insertion arranged in the communication pipe. It is possible to utilize for the purpose any desired wire, the diameter of which is somewhat smaller than the inner diameter of the pipe, so that the insertion in question produces a conducting space of an annular cross-section.

An advantage of this device is that, when once it is filled with oil, the oil owing to the great adhesion, does not come out, so that such a device can be stopped altogether for a longer time, and whenever started again, works at once without any difficulties.

The device can be made of any desired material. As regards the dimensions, it must be pointed out that both the inside diameter of the pipe and the thickness of the insertion wire, can be calculated to suit the dimensions of the different bearings as well as the quantity of oil required for lubricating the shaft.

The device is represented in the annexed drawing in a construction shown by way of example.

Figure 1 is a cross-sectional elevation of a bearing with the lubricating device, and Fig. 2 is a longitudinal section through the lubricating tube represented on an enlarged scale.

The lubricating device consists of tube $a$ bent U-shape, in which the insertion $b$ consisting in the case represented of a wire, is arranged (Fig. 2). When the device is used the end $c$ of same is dipped into the oil receptacle $e$ of the bearing (Fig. 1), while the other end $d$ leads to the place to be oiled, in the case represented to the shaft $f$.

What I claim as my invention and desire to secure by Letters Patent is:—

1. A siphon lubricator for shafts and other parts of machinery comprising a curved communication pipe, and a metallic insertion therein of somewhat smaller diameter than the internal diameter of said pipe and extending throughout the entire length of said pipe so as to increase the surface for the adhesion of the lubricant.

2. A siphon lubricator for shafts and other parts of machinery comprising a curved communication pipe, and a wire insertion therein of somewhat smaller diameter than the internal diameter of said pipe and extending throughout the entire length of said pipe so as to increase the surface for the adhesion of the lubricant.

In testimony whereof I have signed my name to this specification in the presence of two subscribing witnesses.

JOSEF ZSARKÓ.

Witnesses:
 JOSEF WIRKMANN,
 BÉNI GRÜNWALD.

Copies of this patent may be obtained for five cents each, by addressing the "Commissioner of Patents Washington, D. C."